US009950376B2

(12) United States Patent
Imamura et al.

(10) Patent No.: US 9,950,376 B2
(45) Date of Patent: Apr. 24, 2018

(54) MITER SAW HAVING DUST PROOF STRUCTURE FOR BEARING WHICH ALLOWS CUTTING UNIT TO MOVE IN PARALLEL TO BASE SURFACE

(71) Applicant: HITACHI KOKI CO., LTD., Tokyo (JP)

(72) Inventors: Ryuichi Imamura, Hitachinaka (JP); Hideaki Terashima, Hitachinaka (JP); Shigeharu Ushiwata, Hitachinaka (JP)

(73) Assignee: Hitachi Koki Co., Ltd., Tokyo (JP)

( * ) Notice: Subject to any disclaimer, the term of this patent is extended or adjusted under 35 U.S.C. 154(b) by 211 days.

(21) Appl. No.: 14/617,464

(22) Filed: Feb. 9, 2015

(65) Prior Publication Data
US 2015/0246400 A1 Sep. 3, 2015

(30) Foreign Application Priority Data

Feb. 28, 2014 (JP) ................................. 2014-039467

(51) Int. Cl.
*B27B 5/20* (2006.01)
*B23D 47/02* (2006.01)
(Continued)

(52) U.S. Cl.
CPC .......... *B23D 47/02* (2013.01); *B23D 45/048* (2013.01); *F16C 29/10* (2013.01); *F16C 29/06* (2013.01);
(Continued)

(58) Field of Classification Search
CPC ... B23D 45/048; B23D 47/02; F16C 2322/34; F16C 29/06; F16C 29/10; Y10T 83/7697; Y10T 83/7693
See application file for complete search history.

(56) References Cited

U.S. PATENT DOCUMENTS 5,042,822 A * 8/1991 Dreschmann ....... F16C 33/7896
277/353
5,419,642 A * 5/1995 McLarty ............. F16C 33/7843
384/477
(Continued)

FOREIGN PATENT DOCUMENTS

JP 05-149334 A 6/1993
JP 2010-132000 A 6/2010
(Continued)

OTHER PUBLICATIONS

Japan Patent Office Notification for Reason of Refusal for patent application JP2014-039467 (dated Jun. 22, 2017), 6 pages.
(Continued)

*Primary Examiner* — Stephen Choi
(74) *Attorney, Agent, or Firm* — Kilpatrick Townsend & Stockton LLP

(57) ABSTRACT

A miter saw includes a base portion having a mount surface, a cutting unit supporting a saw blade, a support portion, a relative displacement smoothening member, and a sealing structure. The support portion is supported to the base portion for supporting the cutting unit. The support portion includes a rod extending in a sliding direction in parallel to the mount surface and perpendicular to a rotation axis of the saw blade, and a slide-support portion through which the rod slidably extends. The smoothening member is provided between the slide-support portion and the rod. The sealing structure is provided between the slide-support portion and the rod and includes a first seal member provided at one end of the smoothening member, a second seal member provided at an another end of the smoothening member, and a third seal member positioned opposite to the smoothening member with respect to the first seal member.

16 Claims, 8 Drawing Sheets

(51) Int. Cl.
  *B23D 45/04* (2006.01)
  *F16C 29/10* (2006.01)
  *F16C 29/06* (2006.01)

(52) U.S. Cl.
  CPC ....... *F16C 2322/34* (2013.01); *Y10T 83/7697* (2015.04)

(56) References Cited

U.S. PATENT DOCUMENTS

| | | | | |
|---|---|---|---|---|
| 6,102,575 | A * | 8/2000 | Obara | F16C 19/18 384/480 |
| 6,811,316 | B2 * | 11/2004 | Yamashita | F04D 29/049 384/482 |
| 7,287,906 | B2 * | 10/2007 | Wasson | F16C 29/008 384/12 |
| 7,591,593 | B2 * | 9/2009 | Tsujimoto | F16C 33/7896 384/486 |
| 2004/0228558 | A1 * | 11/2004 | Cha | F16C 33/7883 384/486 |
| 2005/0098010 | A1 | 5/2005 | Hu | |
| 2009/0008882 | A1 * | 1/2009 | Peschke | F16C 29/025 277/560 |
| 2011/0290092 | A1 * | 12/2011 | Ushiwata | B23D 45/027 83/471.2 |

FOREIGN PATENT DOCUMENTS

| | | |
|---|---|---|
| JP | 2012-210695 A | 11/2012 |
| JP | 2013-154575 A | 8/2013 |

OTHER PUBLICATIONS

Japan Patent Office Notification for Reason of Refusal for patent application JP2014-039467 (dated Aug. 31, 2017), 6 pages.

* cited by examiner

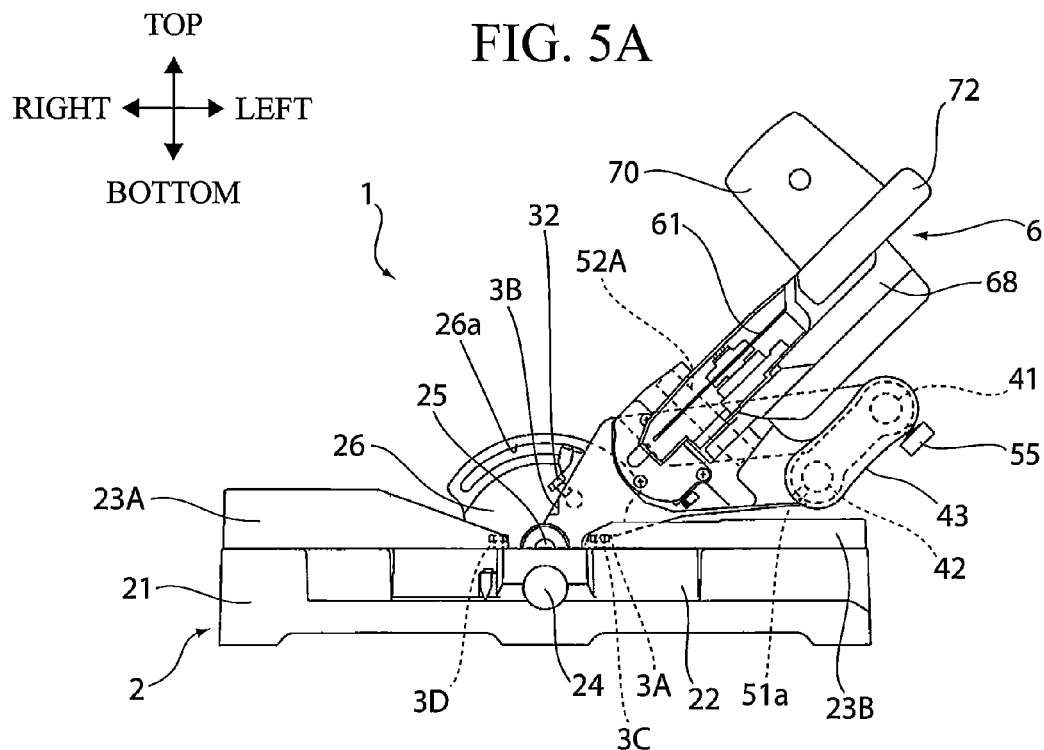
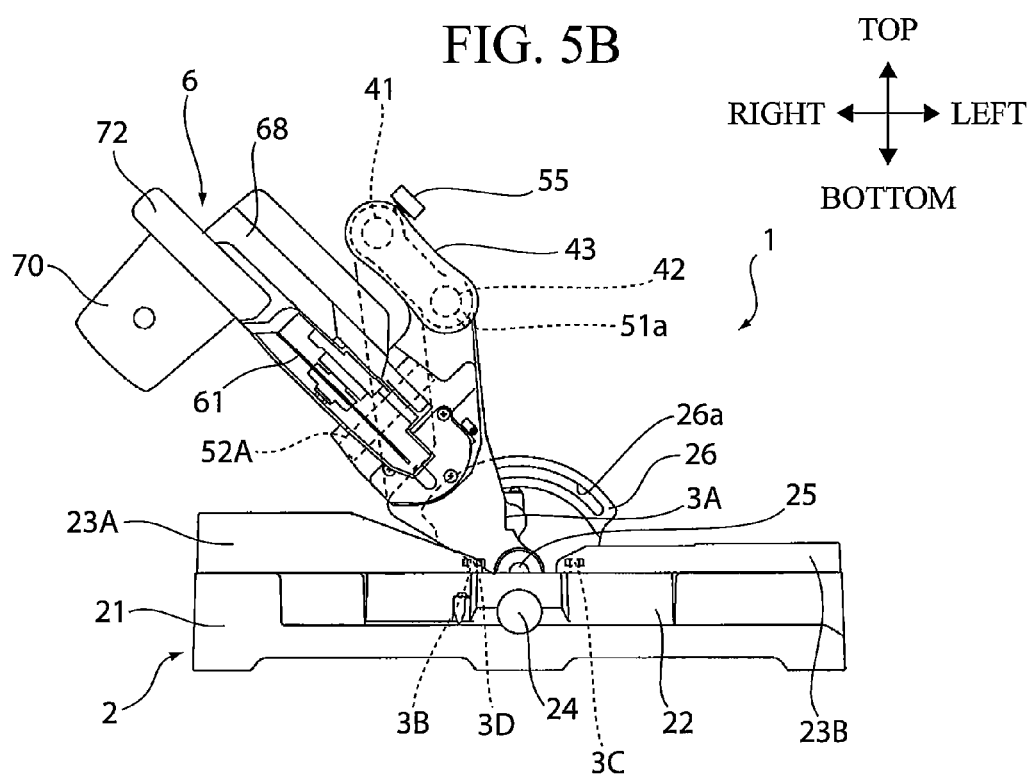

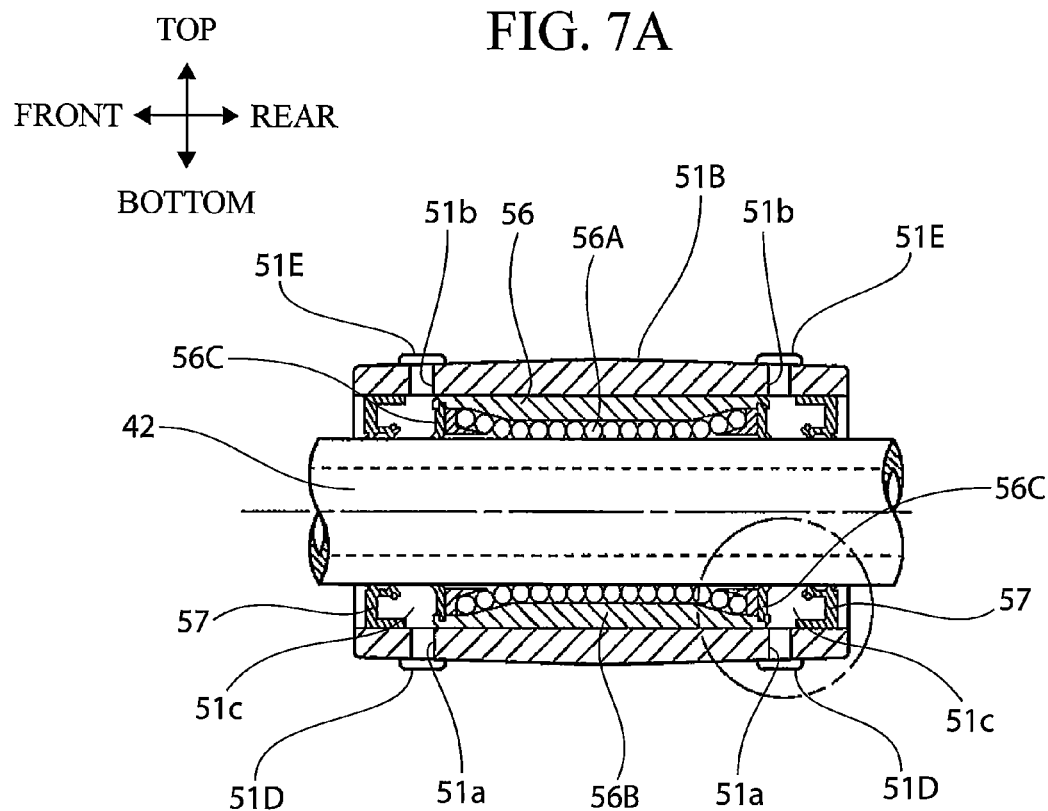
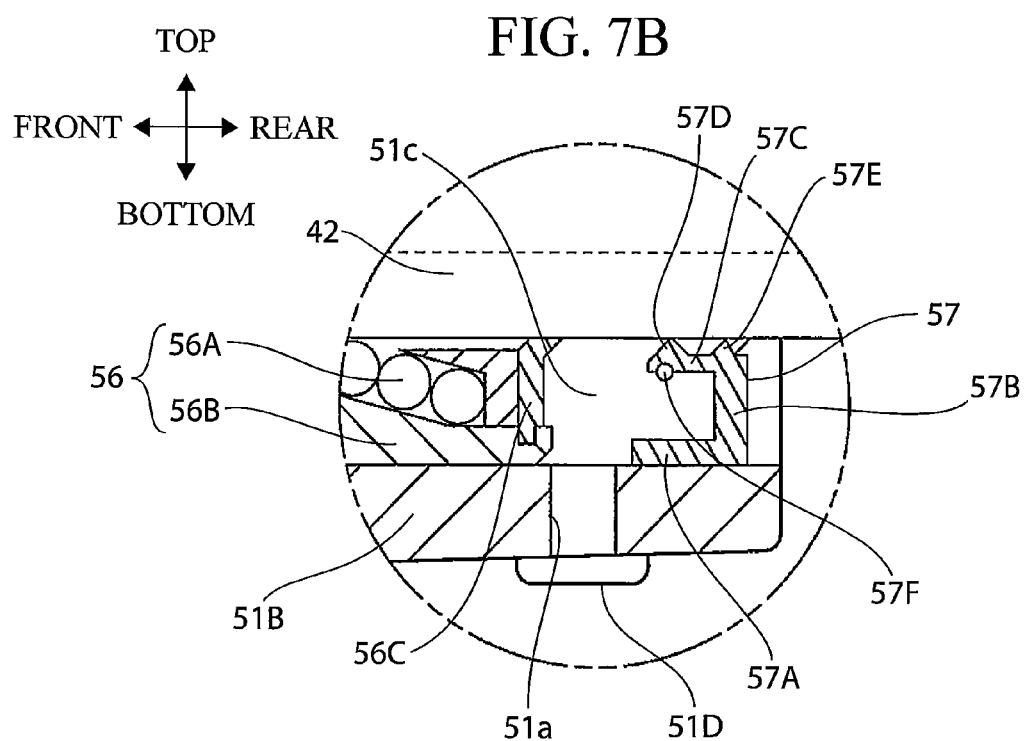

MITER SAW HAVING DUST PROOF STRUCTURE FOR BEARING WHICH ALLOWS CUTTING UNIT TO MOVE IN PARALLEL TO BASE SURFACE

CROSS REFERENCE TO RELATED APPLICATION

This application claims priority from Japanese Patent Application No. 2014-039467 filed Feb. 28, 2014, the entire content of which is incorporated herein by reference.

TECHNICAL FIELD

The present invention relates to a miter saw, and more particularly to a miter saw provided with a slidable cutting unit having a saw blade.

BACKGROUND

Japanese Patent Application Publication No. 2010-132000 discloses a miter saw including a base portion on which a workpiece is mountable, a cutting unit, and a support portion. The cutting unit includes a saw blade and a motor for rotating the saw blade. The support portion is configured to support the cutting unit at a position above the base portion such that the cutting unit is slidably movable in a direction parallel to an upper surface of the base portion and perpendicular to an axis of the saw blade. The support portion includes a rod extending in the sliding direction, and a slide-support portion supporting the cutting unit and movable in the sliding direction and slidably supported to the rod through a bearing portion. The bearing portion has each end provided with a seal member.

SUMMARY

According to the disclosed miter saw, each seal member can prevent a relatively large woody cutting chip generated during cutting operation from entering into the bearing portion. Here, in case of cutting a ceramic material such as a ceramic sizing member, minute or fine particles are generated as a result of cutting. It is conceivable that the disclosed seal member cannot prevent the minute particles from entering into the bearing member. As a result of entry of the minute particles into the bearing portion, rolling resistance of steel balls in the bearing may be increased to generate insufficient rolling or to inhibit rolling. Thus, sliding performance between the rod and the slide-support portion will be degraded to lower cutting accuracy of the miter saw.

In view of the foregoing, it is an object of the invention to provide a miter saw capable of restraining degradation of sliding performance between the rod and the slide-support portion, to thus maintain high cutting accuracy.

In order to attain the above and other objects, the invention provides a miter saw for cutting a workpiece. The miter saw may include a base portion having a mount surface on which the workpiece is to be mounted, a cutting unit rotatably supporting a saw blade having a rotation axis and a side surface, a support portion, a relative displacement smoothening member, and a sealing structure. The support portion is supported to the base portion and is configured to support the cutting unit at a position in confrontation with the mount surface. The support portion has a rod and a slide-support portion through which the rod slidably extends. The rod extends in a sliding direction directed in parallel to the mount surface and perpendicular to the rotation axis and movably supports the cutting unit in the sliding direction. The relative displacement smoothening member is provided between the slide-support portion and the rod and is configured to smoothen movement of the rod in the sliding direction relative to the slide-support portion. The relative displacement smoothening member has one end and another end in the sliding direction. The sealing structure is provided between the slide-support portion and the rod and includes a first seal member provided at the one end, a second seal member provided at the another end, and a third seal member positioned opposite to the relative displacement smoothening member with respect to the first seal member.

BRIEF DESCRIPTION OF THE DRAWINGS

In the drawings:

FIG. 5A is a front view of the miter saw according to the embodiment and showing a state where cutting unit is laterally beveled leftward by 45 degrees;

FIG. 5B is a front view of the miter saw according to the embodiment and showing a state where cutting unit is laterally beveled rightward by 45 degrees;

FIG. 7A is a cross-sectional view taken along a line VII-VII in FIG. 6 and particularly showing a dust proof mechanism in the miter saw;

FIG. 7B is an enlarged view of the dust proof mechanism; and

DETAILED DESCRIPTION

Figure 1:
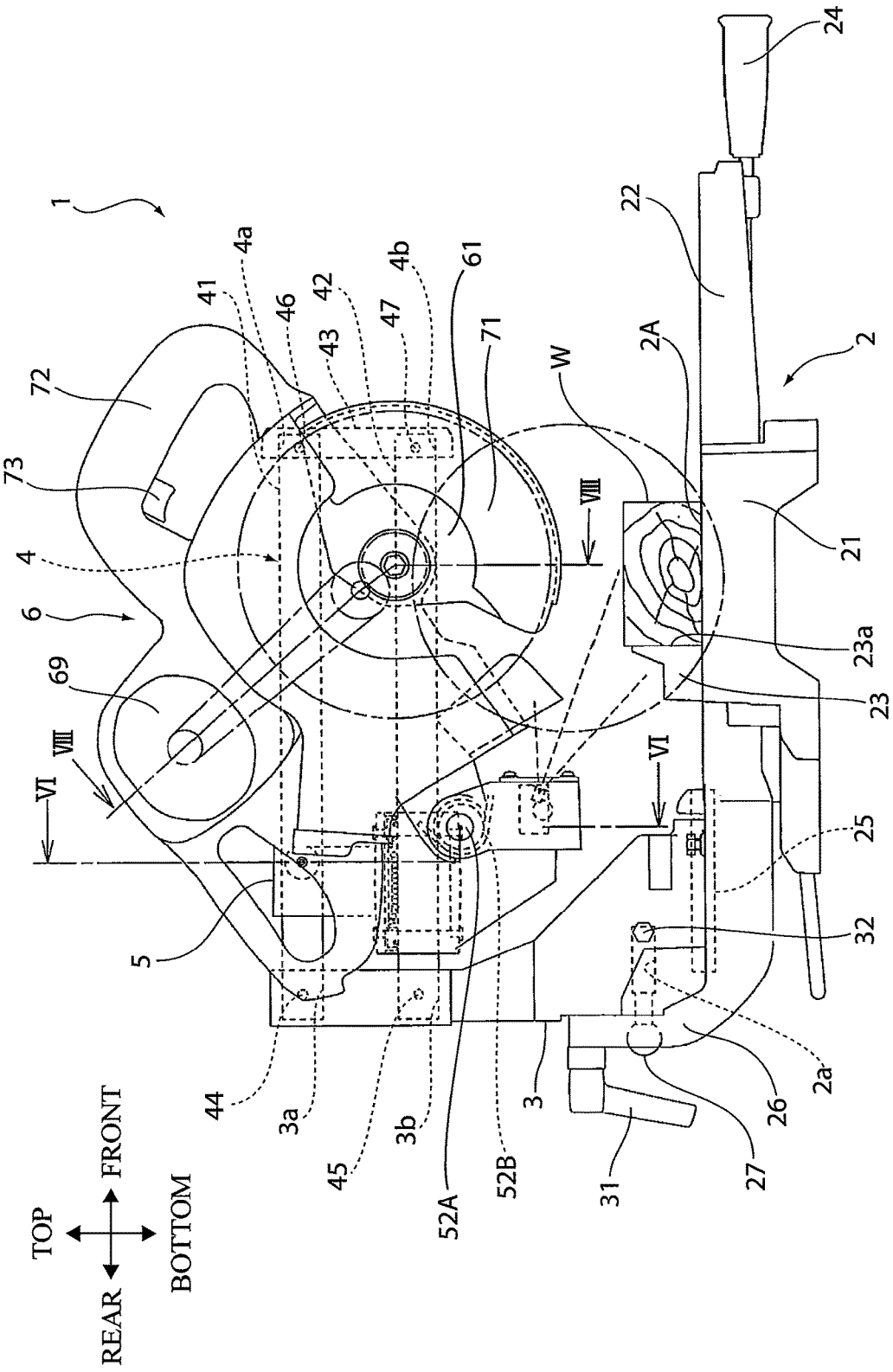
FIG. 1 is a right side view of a miter saw according to one embodiment of the present invention, and showing a state where a cutting unit is slidingly moved rearward.

A miter saw according to one embodiment of the present invention will be described with reference to FIGS. 1 through 8. As shown in FIGS. 1 through 4, the miter saw 1 includes a base portion 2 having a mount surface 2A, a holder 3, a guide portion 4, a shiftable portion 5, and a cutting unit 6 rotatably supporting a circular saw blade 61. In the following description, a direction from the base portion 2 to the guide portion 4 will be referred to as "upward direction", and a direction opposite thereto will be referred to as "downward direction". Further, a direction from the holder 3 to the cutting unit 6 will be referred to as "frontward direction", and a direction opposite thereto will be referred to as "rearward direction". Further, "rightward direction" and "leftward direction" will be used when viewing the miter saw 1 from a rear side thereof in FIG. 1.

Figure 2:
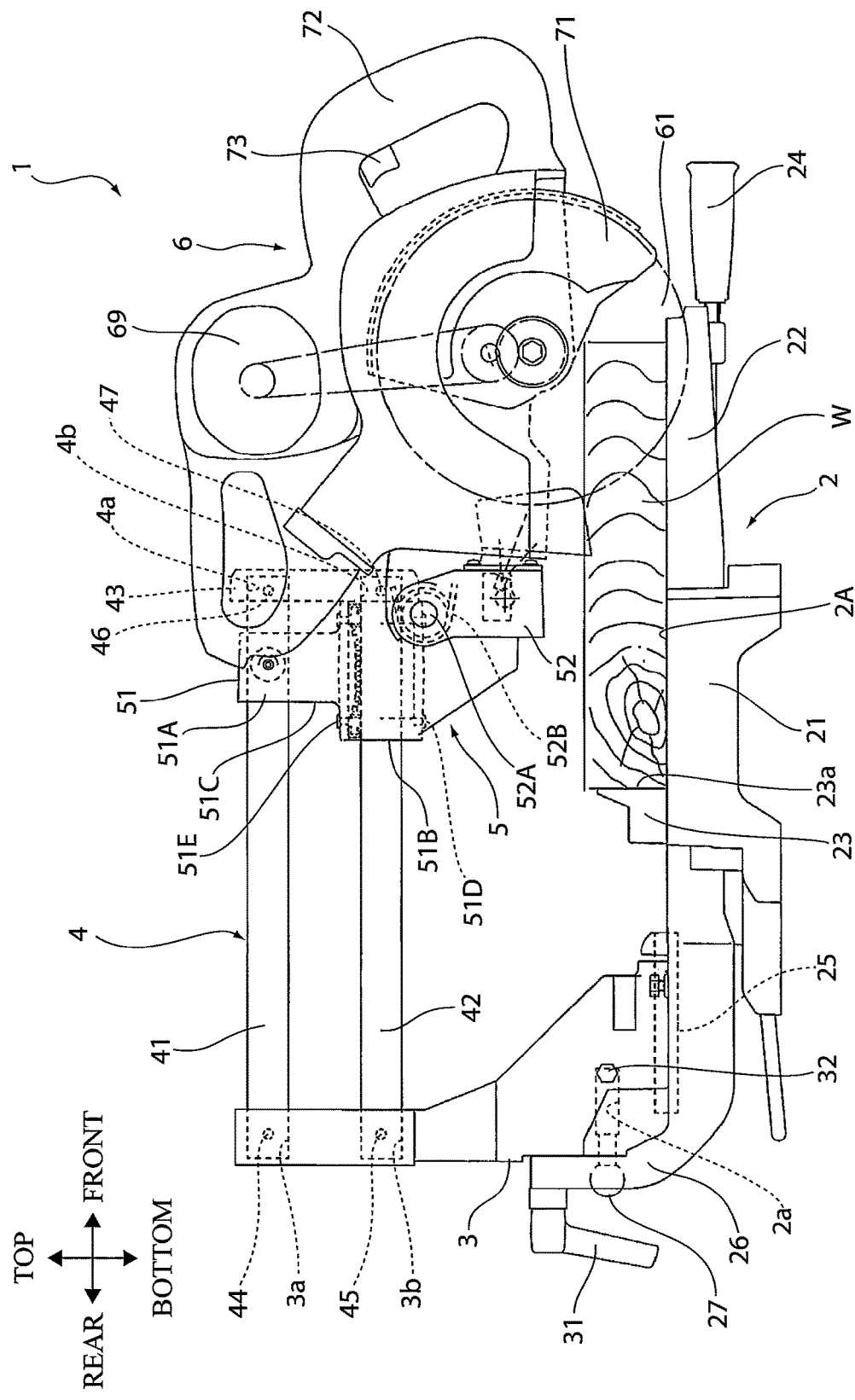
FIG. 2 is a right side view of the miter saw according to the embodiment, and showing a state where the cutting unit is slidingly moved frontward.

As shown in FIGS. 1 and 2, the base portion 2 includes a base 21 to be mounted on a floor or a table, a turntable 22 supported on the base 21, and a fence 23 provided at the base 21. The turntable 22 has an upper surface in flush with an upper surface of the base 21. The turntable 22 is connected to the base 21 such that the turntable 22 is rotatable about an axis of a rotation shaft extending perpendicular to the upper surface. The upper surface of the base 21 and the upper surface of the turntable 22 provide in combination the mount surface 2A on which a workpiece is mounted during cutting operation. The turntable 22 and the base 21 are formed with a groove (not shown) which allows the circular saw blade 61 to be entered thereinto when the cutting unit 6 is moved downward. The circular saw blade 61 is an example of a saw blade.

The fence 23 includes a right fence 23A and a left fence 23B (FIG. 3), and these fences 23A, 23B provide an abutment surface 23a extending in a direction perpendicular to the mount surface 2A. As shown in FIG. 1, cutting operation is performed while one surface of the workpiece is in abutment with the abutment surface 23a. Thus stabilized cutting operation can be achieved.

The turntable 22 has a front portion provided with an operation portion 24 for angularly rotating the turntable 22 and for fixing the angular position of the turntable 22. The turntable 22 has a rear portion provided with a bevel shaft 25 and a protruding portion 26. The bevel shaft 25 extending in frontward/rearward direction in a direction parallel to a side surface of the circular saw blade 61, and has an axis positioned coincident with the upper surface of the turntable 22. As shown in FIG. 2, the protruding portion 26 protrudes upward and is formed with an arcuate slot 26a (FIG. 3) whose center of curvature is coincident with the axis of the bevel shaft 25. Further, the rear portion of the turntable 22 is formed with a through-hole 2a extending in frontward/rearward direction, and a pin 27 is inserted into the through-hole 2a such that the pin 27 is movable in frontward/rearward direction. The pin 27 is adapted for fixing a posture of the cutting unit 6 at a vertically orienting posture for right angle cutting.

The holder 3 upstands from the rear portion of the turntable 22. The holder 3 has a lower portion pivotally movably connected to the turntable 22 through the bevel shaft 25 such that the holder 3 is laterally beveled rightward and leftward about the axis of the bevel shaft 25 relative to the turntable 22 as shown in FIGS. 5A and 5B. The holder 3 is formed with a thread hole (not shown) at a position in alignment with the arcuate slot 26a, and a clamp lever 31 is threadingly engaged with the thread hole. More specifically, the clamp lever 31 has a male thread portion extending through the arcuate slot 26a in the frontward/rearward direction and is threadingly engaged with the thread hole. By operating the clamp lever 31 in an unclamping direction, pressing force of the clamp lever 31 against a surface of the protruding portion 26 is released, so that the holder 3 can be beveled rightward or leftward about the axis of the bevel shaft 25 within a length of the arcuate slot 26a. By operating the clamp lever 31 in a clamping direction, pressing force of the clamp lever 31 is exerted on the surface of the protruding portion 26, so that the posture of the holder 3 relative to the protruding portion 26 can be fixed at a desired bevelling angle. That is the posture of the holder 3 relative to the turntable 22 can be fixed. As shown in FIGS. 5A and 5B, the holder 3 can be beveled relative to the turntable 22 by 45 degrees leftward and by 45 degrees rightward at a maximum. Thus, a range of bevelling angle is 90 degrees (from 45 degrees leftward to 45 degrees rightward). The holder 3 is an example of a bevel portion.

Figure 3:
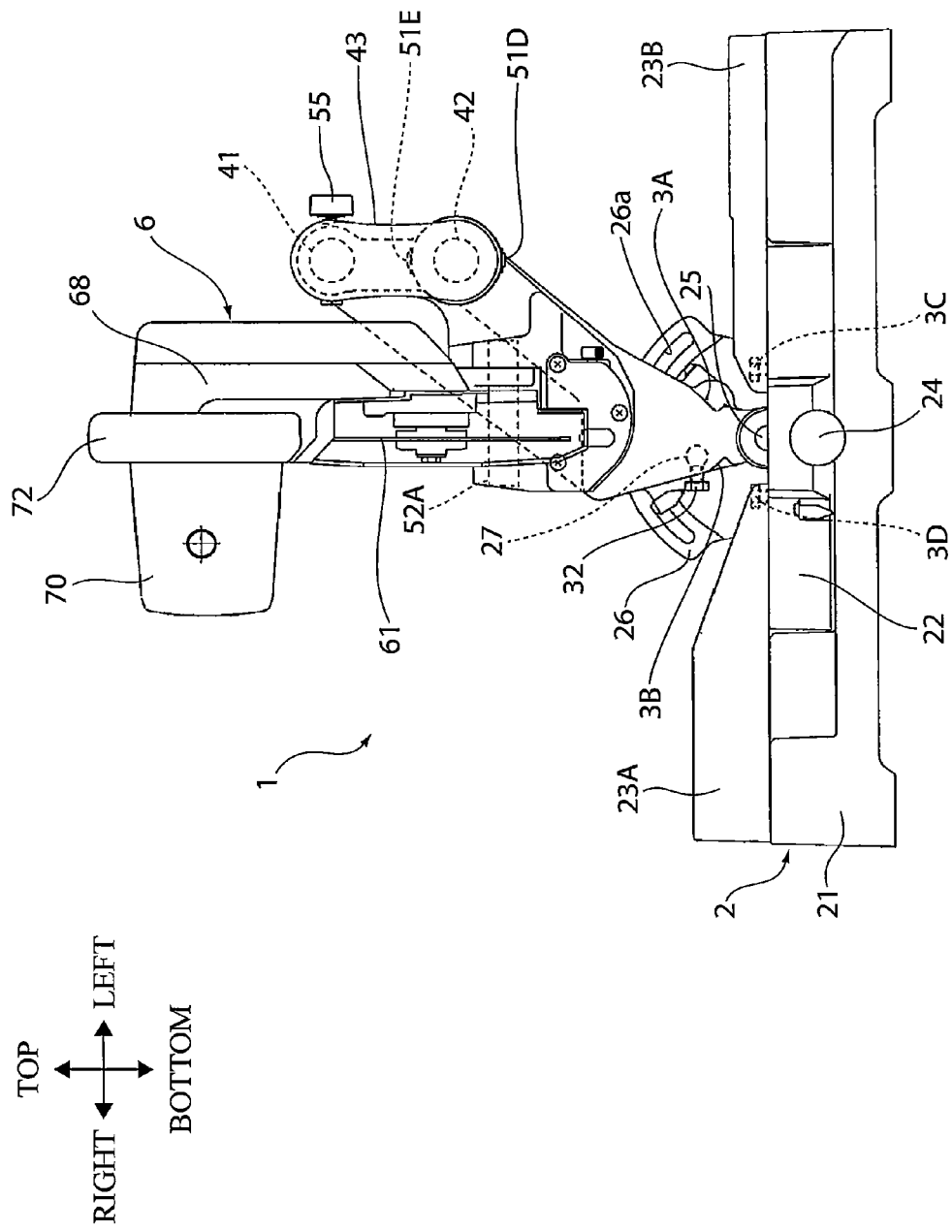
FIG. 3 is a front view of the miter saw according to the embodiment.
Figure 4:
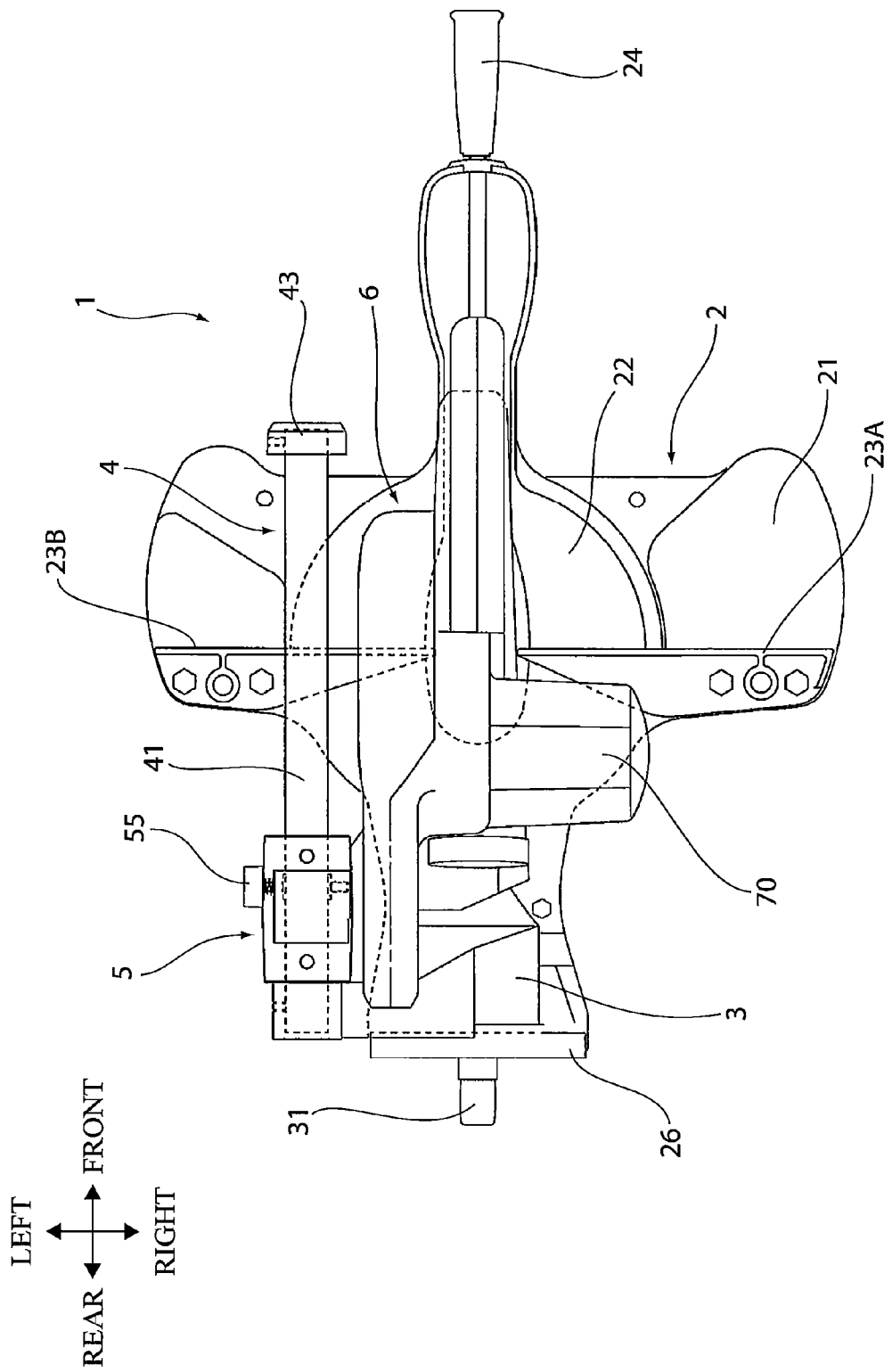
FIG. 4 is a plane view of the miter saw according to the embodiment.

A stop bolt 32 is threadingly engaged with a lower portion of the holder 3. The stop bolt 32 extends in a direction perpendicular to the pin 27 at a position coincident with a linear locus of the pin 27. The stop bolt 32 is positioned at a right side of the holder 3 as shown in FIG. 3. When the holder 3 is at a vertically oriented position, an outer peripheral surface of the pin 27 can be in contact with a tip end of the stop bolt 32 as shown in FIG. 3. Further, the holder 3 can be beveled rightward by axially moving the pin 27 to such an extent that the abutment of the pin 27 against the stop bolt 32 is avoided.

Upper and lower bores 3a, 3b are formed at an upper end portion of the holder 3. These bores extend in a direction parallel to each other and parallel to the mount surface 2A of the base portion 2 and perpendicular to a rotation axis of the circular saw blade 61.

As shown in FIG. 3, stop portions 3A, 3B are provided at a base end portion of the holder 3, and stop bolts 3C, 3D protrude upward from the upper surface of the turntable 22 at positions coincident with loci of the stop portions 3A, 3B. The stopper bolts 3C, 3D each having a head are threadingly engaged vertically with the turntable 22. The stop portions 3A, 3B function as positioning portions when bevelling the holder 3. That is, in accordance with bevelling motion of the holder 3 about the axis of the bevel shaft 25 by a predetermined bevelling angle, one of the stop portions 3A and 3B is brought into abutment with corresponding one of the heads of the stopper bolts 3C and 3D for fixing a bevelling posture of the cutting unit 6. The stop portion 3A abuts against the stopper bolt 3C when the holder 3 is beveled by 45 degrees in leftward direction, and the stop portion 3B abuts against the stopper bolt 3D when the holder 3 is beveled by 45 degrees in rightward direction.

The guide portion 4 includes a first rod 41, a second rod 42 and a coupling member 43. The first rod 41 extends in a sliding direction, i.e., a direction parallel to the mount surface 2A of the base portion 2 and perpendicular to the rotation axis of the circular saw blade 61. The second rod 42 also extends in the sliding direction parallel to the first rod 41, and is positioned lower than the first rod 41. The first rod 41 has a length equal to that of the second rod 42, and smaller than a longitudinal length of the turntable 22 in frontward/rearward direction. The first rod 41 has an outer diameter approximately equal to an inner diameter of the bore 3a. Further, the second rod 42 has an outer diameter approximately equal to an inner diameter of the bore 3b. The first and second rods 41, 42 are formed of tubular member made from material providing high rigidity. The first and second rods 41, 42 each defines an axial direction coincident with the sliding direction.

The first rod 41 and the second rod 42 have rear end portions inserted into the bores 3a, 3b, respectively. The holder 3 is provided with fixing members 44, 45 protrudable into the bores 3a, 3b, respectively. Thus, the first rod 41 and the second rod 42 are fixed to the holder 3 by the fixing members 44, 45 avoiding rotation of these rods and disengagement from the holder 3.

The coupling member 43 is formed with bores 4a, 4b extending in frontward/rearward direction, and front end portions of the first and second rods 41, 42 are inserted into the bores 4a, 4b, respectively. The coupling member 43 is provided with tighteners 46, 47 protrudable into the bores 4a, 4b, respectively. The tighteners 46, 47 fix the first rod 41 and the second rod 42 to the coupling member 43, such that rotation of these rods and disengagement of these rods from the bores 4a, 4b is prevented. The first rod 41 and the second rod 42 are relatively immovable because these rods are fixed to the holder 3 and to the coupling member 43. Further, the first rod 41 and the second rod 42 are laterally beveled along with the lateral bevelling motion of the holder 3 with respect to the turntable 22. The first rod 41 is an example of a guide bar, and the second rod 42 is an example of a rod.

Figure 6:
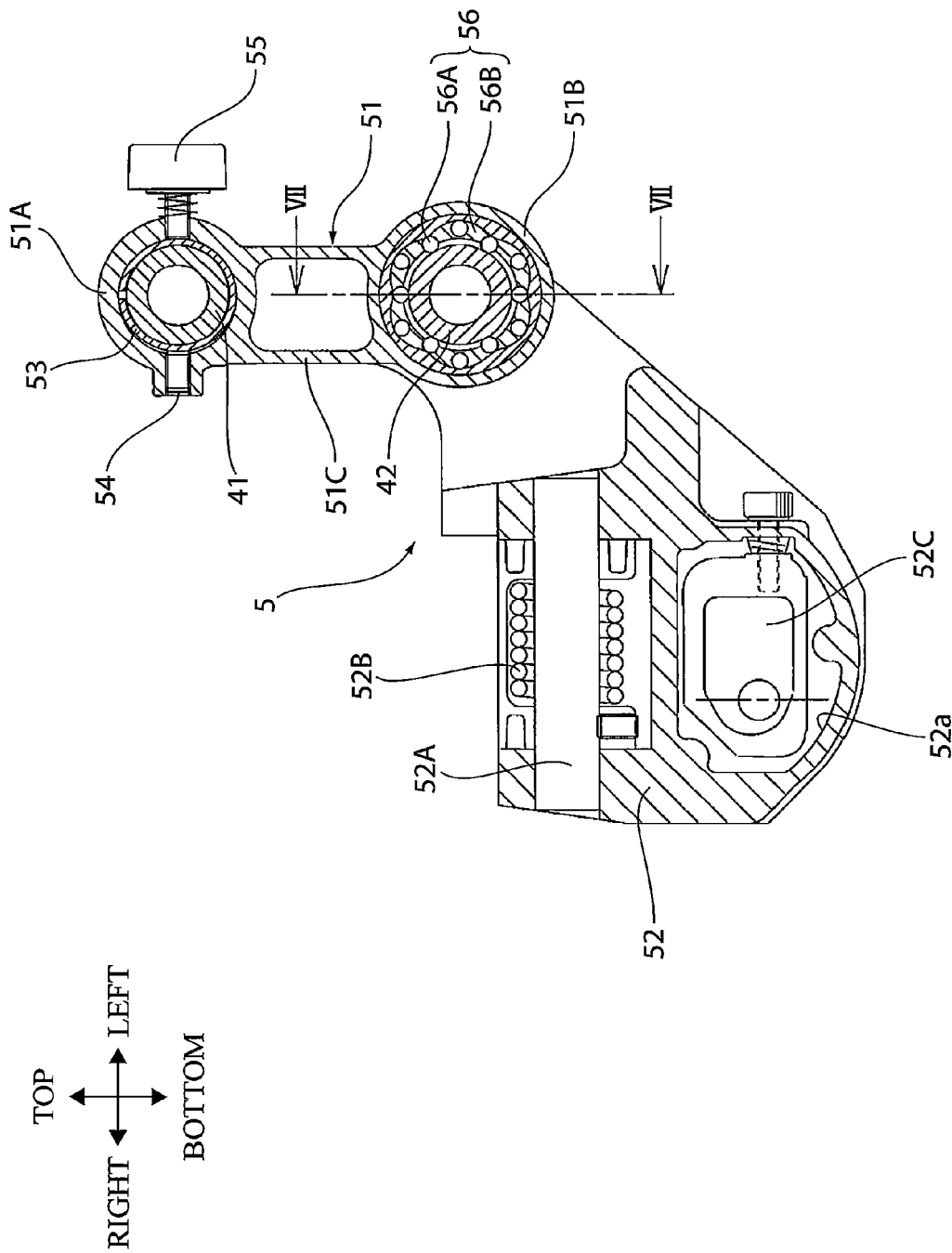
FIG. 6 is a cross-sectional view taken along a line VI-VI in FIG. 1, and particularly showing a shiftable portion of the miter saw.

The shiftable portion 5 pivotally movably supports the cutting unit 6 toward and away from the base portion 2, and is slidably movably supported to the guide portion 4. As shown in FIGS. 2 and 6, the shiftable portion 5 includes a slide portion 51 bridging between the first rod 41 and the second rod 42, and a cutting unit support portion 52 provided integrally with the slide portion 51. A combination of the holder 3, the guide portion 4 and the shiftable portion 5 is an example of a support portion.

The slide portion 51 includes a first cylindrical portion 51A through which the first rod 41 extends, a second cylindrical portion 51B through which the second rod 42 extends, and a connecting portion 51C connecting integrally the first cylindrical portion 51A to the second cylindrical portion 51B. The first cylindrical portion 51A has an axial length smaller than that of the second cylindrical portion 51B such that the slide portion 51 is generally L-shaped in side view. The slide portion 51 is slidably movable on the first rod 41 and the second rod 42 between the holder 3 and the coupling member 43.

The first cylindrical portion 51A is hollow cylindrical extending in frontward/rearward direction. A bushing 53 is provided in a hollow space of the first cylindrical portion 51A. The bushing 53 has an inner diameter approximately equal to an outer diameter of the first rod 41 and is capable of abutting on outer peripheral surface of the first rod 41. The bushing 53 is a hollow cylindrical member extending in frontward/rearward direction, and its upper end portion is slightly open to provide a C-shape in front view. While the first rod 41 extends through the bushing 53, the first cylindrical portion 51A and the first rod 41 are relatively slidingly movable or displaceable. The first cylindrical portion 51A is an example of an inserted portion.

As shown in FIG. 6, a bolt 54 is provided at a right side of the first cylindrical portion 51A and extends into an interior of the first cylindrical portion 51A. The bolt 54 has a tip end in pressure contact with the bushing 53. Amount of displacement in leftward direction of the bushing 53 toward the first rod 41 can be controlled by adjusting pressing force of the bolt 54 against the bushing 53. Therefore, a lateral position of the bushing 53 is controlled by the operation to the bolt 54, to thus control pressure amount between the bushing 53 and the first rod 41. Accordingly, sliding resistance imparted on the shiftable portion 5 can be adjusted.

A knob 55 is provided at a left side of the first cylindrical portion 51A and extends into the interior of the first cylindrical portion 51A. The knob 55 has a tip end in pressure contact with the bushing 53. When the knob 55 presses the outer peripheral surface of the bushing 53 rightward, a diameter of the bushing 53 will be reduced, so that a position of the first cylindrical portion 51A relative to the first rod 41 is fixed through the bushing 53. Accordingly, a position of the shiftable portion 5 relative to the guide portion 4 can be fixed.

The knob 55 is configured to press the bushing 53 such that the shiftable portion 5 is pivotally moved rightward about an axis of the second rod 42. Therefore generation of rattle or backlash between the second cylindrical portion 51B and the second rod 42 can be reduced, to thus provide sufficient sliding performance between the second cylindrical portion 51B and the second rod 42. The knob 55 is an example of a regulation member.

The second cylindrical portion 51B is hollow cylindrical shaped extending in frontward/rearward direction and is integrally connected to the first cylindrical portion 51A by the connecting portion 51C. A linear motion bearing 56 is provided in a hollow space of the second cylindrical portion 51B. The linear motion bearing 56 has an inner diameter approximately equal to an outer diameter of the second rod 42, and is in sliding contact with an outer peripheral surface of the second rod 42. While the second rod 42 extends through the linear motion bearing 56, the second cylindrical portion 51B and the second rod 42 are relatively slidingly movable or displaceable. The second cylindrical portion 51B is an example of a slide-support portion.

As shown in FIG. 7A, the linear motion bearing 56 is an assembly extending in frontward/rearward direction, and has a longitudinal length smaller than the length of the second cylindrical portion 51B. The linear motion bearing 56 includes a plurality of balls 56A and a guide member 56B defining a linear guide path extending in frontward/rearward direction. The plurality of balls 56A is positioned in contact with the outer peripheral surface of the second rod 42, and the guide member 56B is positioned in contact with the inner peripheral surface of the second cylindrical portion 51B. The plurality of balls 56A guided by the linear guide path runs through the linear guide path while being in rolling contact with the second rod 42. The plurality of balls 56A is circularly moved in a conventional manner though an entire path for circulation is not shown. Thus, the second cylindrical portion 51B performs sufficient sliding movement relative to the second rod 42. The linear motion bearing 56 is an example of a relative displacement smoothening member.

In the hollow space of the second cylindrical portion 51B, a dust proof structure is provided at a position adjacent to each longitudinal end of the linear motion bearing 56 for preventing cutting chips or dust generated during cutting operation from entering into an interior of the linear motion bearing 56.

The dust-proof structure will be described in detail. Incidentally, the dust proof structure positioned frontward of the front end of the linear motion bearing 56 is the same as the dust proof structure positioned rearward of the rear end of the linear motion bearing 56, and therefore, description of the dust proof structure at the front side will be omitted.

As shown in FIGS. 7A and 7B, the dust-proof structure includes an inner seal 56C, an outer seal 57, a first communication hole 51a formed in the second cylindrical portion 51B, a second communication hole 51b also formed in the second cylindrical portion 51B, a first cap 51D, and a second cap 51E.

The inner seal 56C is annular shaped in rear view and made from a rubber.

The inner seal 56C is force-fitted in the linear motion bearing 56 at a rear end of the guide portion 56B. The inner seal 56C has an inner peripheral surface in sliding contact with the outer peripheral surface of the second rod 42 for sealing a gap between the guide portion 56B and the second rod 42. The inner seal 56C is an example of a first seal member or a second seal member.

As shown in FIG. 7B, the outer seal 57 is annular shaped in rear view and made from a rubber. The outer seal 57 is force-fitted in the second cylindrical portion 51B. The outer seal 57 is adapted to seal a gap between the outer peripheral surface of the second rod 42 and the inner peripheral surface of the second cylindrical portion 51B for preventing cutting chips and dust from entering into the interior of the second cylindrical portion 51B from an exterior of the second cylindrical portion 51B. The outer seal 57 is positioned spaced away from the inner seal 56C by a predetermined distance, such that the outer seal 57 is positioned opposite to the linear motion bearing 56 with respect to the inner seal 56C. The outer seal 57 is an example of a third seal member or a fourth seal member. A combination of the inner seal 56C and the outer seal 57 is an example of a sealing structure.

The outer seal 57 includes a first seal portion 57A, a second seal portion 57B, and a third seal portion 57C. The first seal portion 57A is fixed to the second cylindrical portion 51B and extends in frontward/rearward direction. The second seal portion 57B extends radially inwardly from a rear end portion of the first seal portion 57A and is integral therewith. The first seal portion 57A is connected to the third seal portion 57C through the second seal portion 57B. The second seal portion 57B has a predetermined width (length) in a radial direction of the second rod 42 to form an annular shape in rear view.

The third seal portion 57C is integral with the second seal portion 57B and cylindrical shaped extending frontward from a radially inner end portion of the second seal portion 57B. The third seal portion 57C includes a first abutment portion 57D, a second abutment portion 57E, and a fastening member 57F. The first abutment portion 57D is positioned at an inner peripheral side of the third seal portion 57C at a front end portion thereof to abut on the outer peripheral surface of the second rod 42. The first abutment portion 57D has a dimension in frontward/rearward direction gradually decreased toward the second rod 42.

The second abutment portion 57E is positioned at the inner peripheral side of the third seal portion 57C at a position rearward of and spaced away from the first abutment portion 57D to abut on the outer peripheral surface of the second rod 42. The second abutment portion 57E is inclined diagonally rearward toward the second rod 42 to form a skirt like shape.

The fastening member 57F is a ring-like resilient member and is positioned at an outer peripheral side of the third seal portion 57C at the front end portion thereof for urging the third seal portion 57C radially inwardly. The first and second abutment portions 57D, 57E allow the second cylindrical portion 51B to move relative to the second rod 42, even though the first and second abutment portions 57D, 57E are in abutment with the outer peripheral surface of the second rod 42. That is, the first and second abutment portions 57D, 57E are in sliding contact with the outer peripheral surface of the second rod 42.

An annular space 51c is defined by the inner seal 56C, the outer seal 57, the outer peripheral surface of the second rod 42, and the second cylindrical portion 51B. The first communication hole 51a is formed at the rear portion of the second cylindrical portion 51B and provides a communication between the annular space 51c and an outside of the second cylindrical portion 51B. The first communication hole 51a extends in a direction such that an open end of the first communication hole 51a is in confrontation with the mount surface 2A when the side surface of the circular saw blade 61 extends in a direction perpendicular to the mount surface 2A, that is, when the bevelling angle of the holder 3 is zero. That is, the first communication hole 51a extends in the direction perpendicular to the mount surface 2A. The annular space 51c is an example of a space.

With this structure, the open end of the first communication hole 51a is still able to face the mount surface 2A even by the lateral bevelling of the holder 3 by 45 degrees in leftward direction in FIG. 5A and even by the lateral bevelling of the holder 3 by 45 degrees in rightward direction in FIG. 5B. That is, the open end of the first communication hole 51a can be positioned to be able to face the mount surface 2A regardless of any bevelling posture of the holder 3 within a beveling range of the holder 3. The first cap 51D is adapted to block the open end of the first communication hole 51a, and is detachably attached to the first communication hole 51a. The first cap 51D is an example of a first blocking member.

As shown in FIG. 7A, the second communication hole 51b is formed in the second cylindrical portion 51B at a position opposite to the first communication hole 51a with respect to the second rod 42 and in linear alignment with the first communication hole 51a for providing communication between the annular space 51c and the outside of the second cylindrical portion 51B. The second cap 51E is adapted to block an open end of the second communication hole 51b, and is detachably attached to the second communication hole 51b. The second cap 51E is an example of a second blocking member.

As shown in FIGS. 1 and 6, a pivot shaft 52A expending perpendicular to the axial direction of the first and second rods 41, 42 is fixed in the cutting unit support portion 52. The cutting unit support portion 52 supports the cutting unit 6 through the pivot shaft 52A such that the cutting unit 6 is pivotally movable about an axis of the pivot shaft 52A toward and away from the base portion 2.

A spring 52B is wound over the pivot shaft 52A for urging the cutting unit 6 to pivotally move upward, that is, in a direction away from the base portion 2. Normally, the cutting unit 6 has an uppermost posture as shown in FIG. 1, and the posture is maintained by a stop mechanism (not shown). For cutting the workpiece, the cutting unit 6 is pivotally moved about the axis of the pivot shaft 52A downward toward the base portion 2 against the biasing force of the spring 52B. By this downward pivot movement, the circular saw blade 61 is entered into the groove (not shown) formed in the turntable 22, and the downward pivot movement of the cutting unit 6 is stopped by the stop mechanism (not shown) upon entry of the circular saw blade 61 by a predetermined amount.

A recessed portion 52a is provided in the cutting unit support portion 52 at a position lower than the pivot shaft 52A, and a laser oscillator 52C is provided in the recessed portion 52a. The laser oscillator 52C is displaceable in the axial direction of the circular saw blade 61, so that a laser beam emitted from the laser oscillator 52C can pass through an imaginary line which is an extension line from the side surface of the circular saw blade 61 to irradiate the workpiece.

Figure 8:
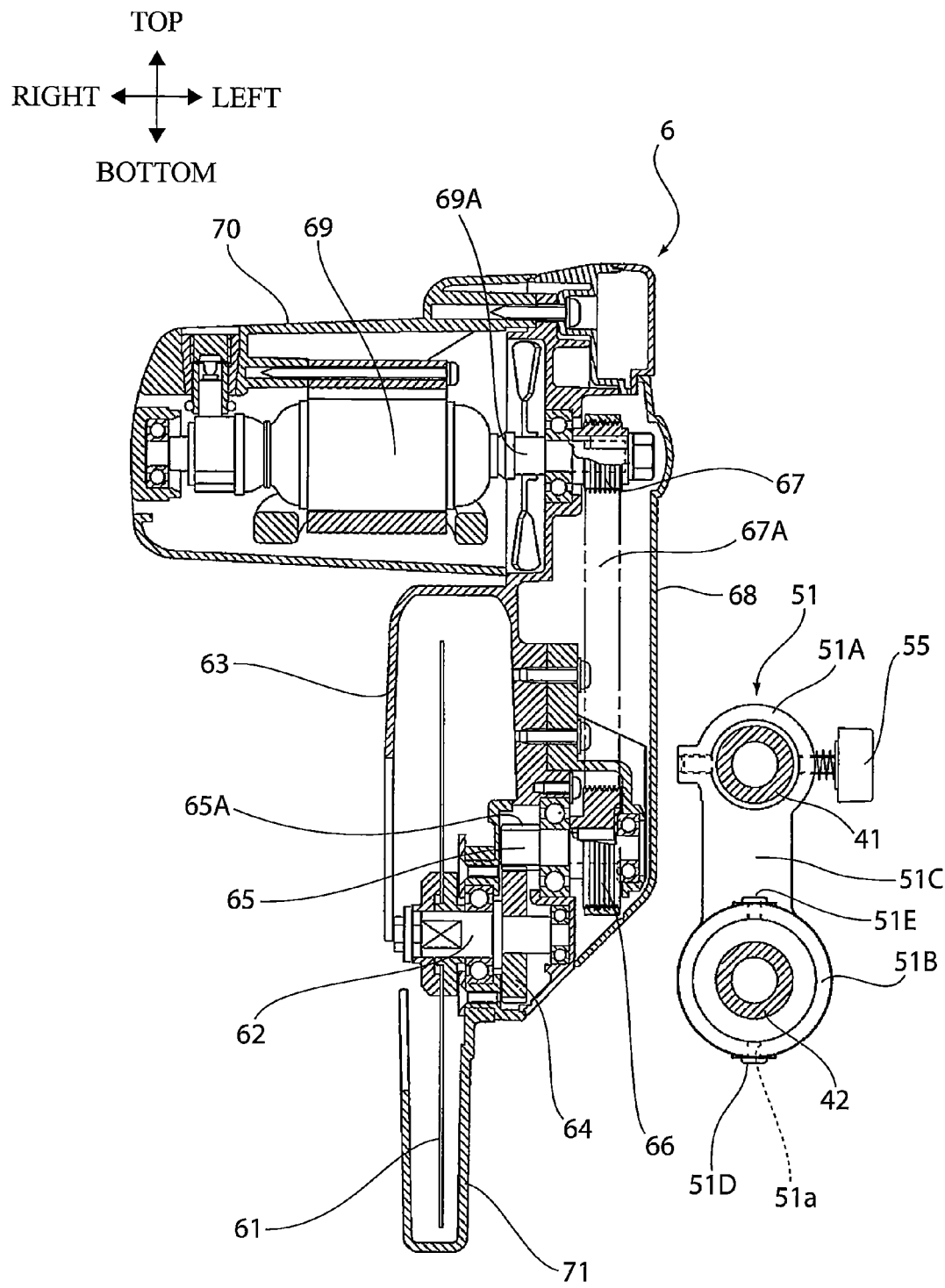
FIG. 8 is a cross-sectional view taken along a line VIII-VIII in FIG. 1 and particularly showing an internal structure of the cutting unit of the miter saw.

As shown in FIG. 8, the cutting unit 6 has a housing including a saw cover 63, a gear cover 68, and a motor housing 70. The saw cover 63 is shaped to cover a part of an outer peripheral end portion of the circular saw blade 61. The gear cover 68 is connected to the saw cover 63 and is shaped to cover a saw shaft 62 which is a rotation shaft of the circular saw blade 61, a gear 64, a pulley shaft 65, pulleys 66, 67, and a power transmission belt 67A. The motor housing 70 is connected to the gear cover 68 and is shaped to cover a motor 69 and a motor shaft 69A. The gear cover 68 is pivotally movable about the axis of the pivot shaft 52A, so that the cutting unit 6 can be pivotally moved downward and upward.

The circular saw blade 61 is supported to the saw shaft 62 integrally rotatable with the gear 64. The pulley 66 is coupled to the pulley shaft 65 which has a pinion gear 65A meshingly engaged with the gear 64. The motor 69 is disposed to extend parallel to the saw shaft 62 and to intersect with an extension line extending from the side surface of the circular saw blade 61. The pulley 67 is fixed to the motor shaft 69A. The power transmission belt 67A is mounted over the pulleys 66 and 67 for transmitting rotation of the motor shaft 69A to the pulley 66.

A protective cover 71 is pivotally movably supported to the saw cover 63 for covering a part of the outer peripheral end portion of the circular saw blade 61, the part being protruding from the saw cover 63. As shown in FIG. 1, the protective cover 71 is pivotally moved to an exposure position for covering the part of the outer peripheral end portion of the circular saw blade 61 when the cutting unit 6 is moved to the upper pivot position, and as shown in FIG. 2, the protective cover 71 is pivotally moved to a retracted position retracted into the saw cover 63 by a link mechanism not shown so as to expose the part of the outer peripheral end portion of the circular saw blade 61 when the circular saw unit 6 is moved to the lower pivot position.

The motor housing 70 has a handle 72 integrally therewith at a position on the extension line extending from the side surface of the circular saw blade 61, and a switch 73 for controlling the motor 69 is provided at the handle 72. Because the handle 72 is positioned on the extension line, reaction force can be linearly imparted on the handle 72 during cutting operation (during downward pivot motion of the cutting unit 6) through the circular saw blade 61. Therefore, unwanted inclination of the cutting unit 6 due to application of offsetting reaction force can be avoided. Further, the motor housing 70 is provided with a fixing mechanism (not shown) for fixing the lowermost pivot posture of the cutting unit 6 relative to the shiftable portion 5. This fixing mechanism can facilitate transportation of the miter saw 1 or hand carrying the miter saw 1.

Next, operation in the miter saw 1 will be described. For cutting the workpiece, the switch 73 provided at the handle 72 is operated for starting rotation of the motor 69 to rotate the circular saw blade 61 through the saw shaft 62. While maintaining this state, the handle 72 is gripped and pressed down against the biasing force of the spring 52B to move the cutting unit 6 downward to thus cut the workpiece. Cutting to the workpiece is completed as the blade edge of the circular saw blade 61 is entered into the groove formed in the turntable 22. Then, the pressing force to the cutting unit 6 is released. Thus, the cutting unit 6 can be returned to the uppermost position by the biasing force of the spring 52B.

In order to perform a miter cutting, the turntable 22 is angularly rotated relative to the base 21 so that the holder 3 connected to the turntable 22, the guide portion 4 fixed to the holder 3, the shiftable portion 5 supported to the guide portion 4, and the cutting unit 6 supported to the shiftable portion 5 change their positions relative to the fence 23. As a result, an angle defined between the abutment surface 23a of the fence 23 and the side surface of the circular saw blade 61 can be changed. Consequently, the workpiece can be cut at a desired angle dependent on the angular rotational position of the turntable 22.

In order to perform a bevel cutting in which diagonal cutting is performed in a thickness direction of the workpiece, as shown in FIGS. 5A and 5B, beveling position of the holder 3 is adjusted to adjust an intersecting angle defined between the side surface of the circular saw blade 61 and the upper surface of the turntable 22. To this effect, clamping state of the holder 3 is released by unclamping the clamp lever 31 to allow the holder 3 to be beveled rightward about the axis of the bevel shaft 25. Then, the stop portion 3B is brought into abutment with the stopper bolt 3D, so that the holder 3 can be subjected to positioning at rightward beveling angle of 45 degrees. In this state, the clamp lever 31 is clamped to fix the rightward beveling posture of the holder 3. Thereafter, cutting operation is performed in the above-described manner.

In order to cut an elongated workpiece, the knob 55 is unfastened so that the shiftable portion 5 is slidable relative to the guide portion 4. The coupling member 43 prevents the shiftable portion 5 from further moving frontward (in a direction away from the holder 3) as shown in FIG. 2 by the abutment with the shiftable portion 5, thus defining a front-most end position of the cutting unit 6. Further, the holder 3 prevents the shiftable portion 5 from further moving rearward as shown in FIG. 1 by the abutment with the shiftable portion 5, thus defining a rearmost end position of the cutting unit 6.

By pushing the cutting unit 6 toward the holder 3 with maintaining the lower pivot posture of the cutting unit 6, the shiftable portion 5 slidingly moves along the guide portion 4, so that the circular saw blade 61 moves toward the holder 3 to perform elongated cutting. After completion of cutting, pressing force to the cutting unit 6 is released, thereby returning the cutting unit 6 to an original uppermost position by the biasing force of the spring 52B.

In the miter saw 1 according to the depicted embodiment, since two seal members such as the inner seal 56C and the outer seal 57 are provided, these seals can prevent the minute particles from entering into the interior of the liner motion bearing 56. Therefore, degradation in sliding performance between the second rod 42 and the second cylindrical portion 51B can be restrained, thereby maintaining high cutting accuracy.

Further, since the annular space 51c is provided between the inner seal 56C and the outer seal 57, the minute particle that cannot be blocked by the outer seal 57 can be temporarily stopped in the annular space 51c. Therefore, prolonged time period is required for the minute particle to reach the interior of the liner motion bearing 56. Thus, sufficient sliding performance between the second rod 42 and the second cylindrical portion 51B can be maintained for a prolonged period.

In this case, by removing the first cap 51D from the first communication hole 51a, minute particles temporarily stayed in the annular space 51c can be discharged out of the second cylindrical portion 51B through the first communication hole 51a. Consequently, entry of the minute particles temporarily staying in the annular space 51c into the interior of the linear motion bearing 56 can further be avoided, thereby further maintaining sufficient sliding performance between the second rod 42 and the second cylindrical portion 51B.

Further, the first communication hole 51a is always positioned toward the mount surface 2A at every beveling posture of the holder 3. Therefore, the first communication hole 51a can be directed toward the ground if the mount surface 2A is directed in parallel to the ground. Consequently, discharge of the minute particle temporarily staying in the annular space 51c to an outside of the second cylindrical portion 51B can be facilitated, because minute particle can be discharged through the first communication hole 51a because of gravity. Thus, maintenance to the miter saw can be facilitated.

As described above, the second communication hole 51b is positioned in linear alignment with the first communication hole 51a, and the second cap 51E is provided at the second communication hole 51b. Therefore, by detaching the first and second caps 51D, 51E from the first and second communication holes 51a, 51b, and by pouring wash oil into the annular space 51c through the second communication hole 51b, minute particles temporarily staying in the annular space 51c can be easily discharged outside through the first communication hole 51a. Thus, maintenance to the miter saw 1 can further be facilitated, and further prolonged sliding performance can be obtained between the second rod 42 and the second cylindrical portion 51B.

Further, the outer seal 57 has the first abutment portion 57D and the second abutment portion 57E spaced away from each other in the sliding direction. Accordingly, stabilized sliding performance between the second rod 42 and the second cylindrical portion 51B can be obtained, and entry of the minute particles into the interior of the linear motion bearing 56 can be restrained.

As mentioned above, the miter saw 1 includes the base portion 2 having the mount surface 2A on which the workpiece is to be mounted, the cutting unit 6 rotatably supporting the circular saw blade 61 having the rotation axis and the side surface, the holder 3, the guide portion 4, the shiftable portion 5. The linear motion bearing 56, the inner seals 56C and the outer seals 57. The holder 3 is supported to the base portion 2. The guide portion 4 has the second rod 42. The shiftable portion 5 is configured to support the cutting unit 6 at a position in confrontation with the mount surface 2A. The shiftable portion 5 has the second cylindrical portion 51B through which the second rod 42 slidably extends. The second rod 42 extends in the sliding direction directed in parallel to the mount surface 2A and perpendicular to the rotation axis and movably supports the cutting unit 6 in the sliding direction. The linear motion bearing 56 is provided between the second cylindrical portion 51B and the second rod 42 and is configured to smoothen movement of the second rod 42 in the sliding direction relative to the second cylindrical portion 51B. The linear motion bearing 56 has one end and another end in the sliding direction. The inner seals 56C and the outer seals 57 are provided between the second cylindrical portion 51B and the second rod 42. Each inner seal 56C is provided at each end of the liner motion bearing 56. The outer seal 57 is positioned opposite to the linear motion bearing 56 with respect to the inner seal 56C.

In this way, since two seal members such as the inner seal 56C and the outer seal 57 are provided at one end side of the liner motion bearing 56, these seals can prevent the minute particles from being entering into the interior of the liner motion bearing 56. Therefore, degradation in sliding performance between the second rod 42 and the second cylindrical portion 51B can be restrained, thereby maintaining high cutting accuracy.

Further, the miter saw 1 according to the depicted embodiment, two seal members such as the inner seal 56C and the outer seal 57 are provided at another end side of the liner motion bearing 56, these seals can prevent the minute particles from being entering into the interior of the liner motion bearing 56. Hence, degradation in sliding performance between the second rod 42 and the second cylindrical portion 51B can further be restrained, thereby maintaining high cutting accuracy.

Further, since the outer seal 57 is positioned away from the inner seal 56C to provide the annular space 51c between the inner seal 56C and the outer seal 57, the minute particle that cannot be blocked by the outer seal 57 can be temporarily stopped in the annular space 51c. Therefore, prolonged time period is required for the minute particle to reach the interior of the liner motion bearing 56. Thus, sufficient sliding performance between the second rod 42 and the second cylindrical portion 51B can be maintained for a prolonged period.

Further, the second cylindrical portion 51B has the first communication hole 51a providing communication between the annular space 51c and the outside. The miter saw 1 further includes the first cap 51D detachably attached to the second cylindrical portion 51B for closing the first communication hole 51a. Accordingly, by removing the first cap 51D from the first communication hole 51a, minute particles temporarily stayed in the annular space 51c can be discharged out of the second cylindrical portion 51B through the first communication hole 51a. Consequently, entry of the minute particles temporarily staying in the annular space 51c into the interior of the linear motion bearing 56 can further be avoided, thereby further maintaining sufficient sliding performance between the second rod 42 and the second cylindrical portion 51B.

Further, the holder 3 supports the second rod 42 and is supported to the base portion 2. The holder 3 is configured to bevel relative to the base portion 2 along with the cutting unit 6 such that the side surface of the circular saw blade 61 bevels relative to the mount surface 2A. The second cylindrical portion 51B is a hollow cylindrical. The first communication hole 51a is always directed toward the mount surface 2A at any beveling angle of the holder 3 within the beveling range of holder 3. Therefore, the first communication hole 51a can be directed toward the ground if the mount surface 2A is directed in parallel to the ground. Consequently, discharge of the minute particle temporarily staying in the annular space 51c to an outside of the second cylindrical portion 51B can be facilitated, because the minute particle can be discharged through the first communication hole 51a because of gravity. Thus, maintenance to the miter saw can be facilitated.

Further, the first communication hole 51a extends through the second cylindrical portion 51B in a direction in confrontation with the mount surface when the holder 3 has a posture such that the side surface of the circular saw blade 61 extends perpendicular to the mount surface 2A. Therefore, discharge of the minute particle temporarily staying in the annular space 51c to an outside of the second cylindrical portion 51B can further be facilitated, because the minute particle can be effectively discharged through the first communication hole 51a because of gravity. Thus, maintenance to the miter saw can further be facilitated.

Further, the second cylindrical portion 51B has the second communication hole 51b providing communication between the annular space 51c and the outside and at a position in alignment with the first communication hole 51a. The miter saw further includes the second cap 51E detachably attached to the second cylindrical portion 51B for closing the second communication hole 51b. Therefore, by detaching the first and second caps 51D, 51E from the first and second communication holes 51a, 51b, and by pouring wash oil into the annular space 51c through the second communication hole 51b, minute particles temporarily staying in the annular space 51c can be discharged outside through the first communication hole 51a. Thus, maintenance to the miter saw 1 can further be facilitated, and further prolonged sliding performance between the second rod 42 and the second cylindrical portion 51B can be obtained.

Further, the outer seal 57 includes the first abutment portion 57D in abutment with the second rod 42, and the second abutment portion 57E in abutment with the second rod 42 at a position away from the first abutment portion 57D in the sliding direction. Accordingly, stabilized sliding performance between the second rod 42 and the second cylindrical portion 51B can be obtained, and entry of the minute particles into the interior of the linear motion bearing 56 can be restrained.

Further, the first rod 41 extends in a direction parallel to the second rod 42 and is immovable relative to the second rod 42. The first cylindrical portion 51A is connected to the second cylindrical portion 51B immovable relative to the second cylindrical portion 51B. The first cylindrical portion 51A has a hollow cylindrical shape through which the first rod 41 extends. The first rod 41 and the first cylindrical portion 51A are movable relative to each other while the first rod 41 extends through the first cylindrical portion 51A. The knob 55 is provided to the first cylindrical portion 51A and is configured to restrict relative movement between the first rod 41 and the first cylindrical portion 51A. Therefore, the relative movement between the first rod 41 and the first cylindrical portion 51A can be restricted, and cutting operation can be performed at a desired position of the cutting unit 6 in the sliding direction. Thus, enhanced usability can be obtained.

Further, the knob 55 is configured to press the first rod 41 in a direction such that the first and second cylindrical portion 51A 51B are angularly moved about the axis of the second rod 42 in order to restrict the relative movement. Accordingly, change in positional relationship between the second cylindrical portion 51B and the second rod 42 in a radial direction of the second rod 42 can be restrained. Therefore, generation of rattle or backlash between the second cylindrical portion 51B and the second rod 42 can be reduced, to thus provide sufficient sliding performance between the second cylindrical portion 51B and the second rod 42.

Further, since the miter saw 1 includes the linear motion bearing 56 provided between the second cylindrical portion 51B and the second rod 42, enhanced sliding performance between the second cylindrical portion 51B and the second rod 42 can be obtained in spite of simple structure.

Further, the holder 3 extends from the base portion 2 and fixes the second rod 42. The second cylindrical portion 51B supports the cutting unit 6 and is slidably movable relative to the second rod 42 through the linear motion bearing 56.

While the invention has been described in detail with reference to the above-described embodiments thereof, it would be apparent to those skilled in the art that various changes and modifications may be made therein without departing from the spirit of the invention. For example, according to the above-described embodiment, the second rod 42 is fixed to the holder 3 extending from the base portion 2, and second cylindrical portion 51B of the shiftable portion 5 supports the cutting unit 6 and is slidaby movable relative to the second rod 42 through the linear motion bearing 56. In contrast, the second cylindrical portion 51B of the shiftable portion 5 may be fixed to the holder 3, and second rod 42 extends through the second cylindrical portion 51B such that the linear motion bearing 56 is provided between the second rod 42 and the second cylindrical portion 51B, the cutting unit 6 can be provided to the second rod 42 at a fixed position.

What is claimed is:

1. A miter saw for cutting a workpiece comprising:
    a base portion having a mount surface on which the workpiece is to be mounted;
    a cutting unit rotatably supporting a saw blade having a rotation axis and a side surface;
    a support portion supported to the base portion and configured to support the cutting unit, the support portion comprising a rod and a slide-support portion through which the rod slidably extends, the rod extending in a sliding direction directed in parallel to the mount surface and perpendicular to the rotation axis and movably supporting the cutting unit in the sliding direction;
    a bearing provided between the slide-support portion and the rod and configured to smoothen movement of the rod in the sliding direction relative to the slide-support portion, the bearing having one end and another end in the sliding direction;
    a sealing structure provided between the slide-support portion and the rod, the sealing structure comprising:
        a first seal member provided at the one end,
        a second seal member provided at the another end, and
        a third seal member positioned opposite to the bearing with respect to the first seal member, the third seal member being positioned away from the first seal member to provide a space between the first seal member and the third seal member, the slide-support portion having a first communication hole providing communication between the space and an outside; and
    a first blocking member detachably attached to the slide-support portion for closing the first communication hole.

2. The miter saw as claimed in claim 1, wherein the sealing structure further comprises a fourth seal member positioned opposite to the bearing with respect to the second seal member in the sliding direction.

3. The miter saw as claimed in claim 1, wherein the support portion comprises a bevel portion supporting the rod and supported to the base portion, the bevel portion being configured to bevel relative to the base portion along with the cutting unit such that the side surface of the saw blade bevels relative to the mount surface; and
    wherein the slide-support portion is a hollow cylindrical, the first communication hole being always directed toward the mount surface at any beveling angle of the bevel portion within a beveling range of the bevel portion.

4. The miter saw as claimed in claim 3, wherein the first communication hole extends through the slide-support portion, the first communication hole extending in a direction perpendicular to the mount surface when the bevel portion has a posture such that the side surface of the saw blade extends perpendicular to the mount surface.

5. The miter saw as claimed in claim 1, wherein the slide-support portion has a second communication hole providing communication between the space and the outside and at a position in alignment with the first communication hole; and
    the miter saw further comprising a second blocking member detachably attached to the slide-support portion for closing the second communication hole.

6. The miter saw as claimed in claim 1, wherein the third seal member comprises a first abutment portion in abutment with the rod, and a second abutment portion in abutment with the rod at a position away from the first abutment portion in the sliding direction.

7. The miter saw as claimed in claim 1, wherein the support portion comprises:
    a guide bar extending in a direction parallel to the rod and immovable relative to the rod;
    an inserted portion connected to the slide-support portion immovable relative to the slide-support portion, the inserted portion having a hollow cylindrical shape through which the guide bar extends, the guide bar and the inserted portion being movable relative to each other while the guide bar extends through the inserted portion; and a regulation member provided to the inserted portion and configured to restrict relative movement between the guide bar and the inserted portion.

8. The miter saw as claimed in claim 7, wherein the regulation member is configured to press the guide bar in a direction such that the slide-support portion and the inserted portion are angularly moved about an axis of the rod in order to restrict the relative movement.

9. The miter saw as claimed in claim 1, wherein the relative displacement smoothening member comprises a linear motion bearing.

10. The miter saw as claimed in claim 1, wherein the support portion comprises a holder extending from the base portion and fixing the rod, the slide-support portion supporting the cutting unit and being slidably movable relative to the rod through the relative displacement smoothening member.

11. The miter saw as claimed in claim 1, wherein the support portion comprises a holder extending from the base portion and fixing the slide-support portion, the rod supporting the cutting unit and being slidably movable relative to the slide-support portion through the relative displacement smoothening member.

12. The miter saw as claimed in claim 1, wherein the first seal member and the second seal member are in contact with the rod.

13. The miter saw as claimed in claim 1, wherein the third seal member comprises an abutment portion which is in contact with the rod, the abutment portion having a dimension in the sliding direction gradually decreased toward the rod.

14. The miter saw as claimed in claim 13, wherein the third seal member further comprises a second abutment portion which is in contact with the rod, the second abutment portion being spaced away from the abutment portion in the sliding direction.

15. The miter saw as claimed in claim 1, wherein the sealing structure further comprises a fastening member urging the third seal member radially inwardly.

16. The miter saw as claimed in claim 12, wherein the bearing further comprises:

a ball configured to contact the rod; and a guide member supporting the ball and spaced away from the rod.

* * * * *